J. H. BROCKMAN.
Rectifying Apparatus.
No. 207,847. Patented Sept. 10, 1878.
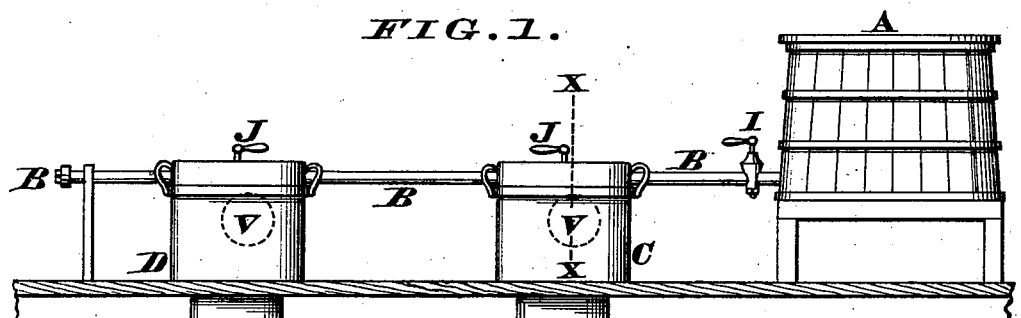
FIG. 1.
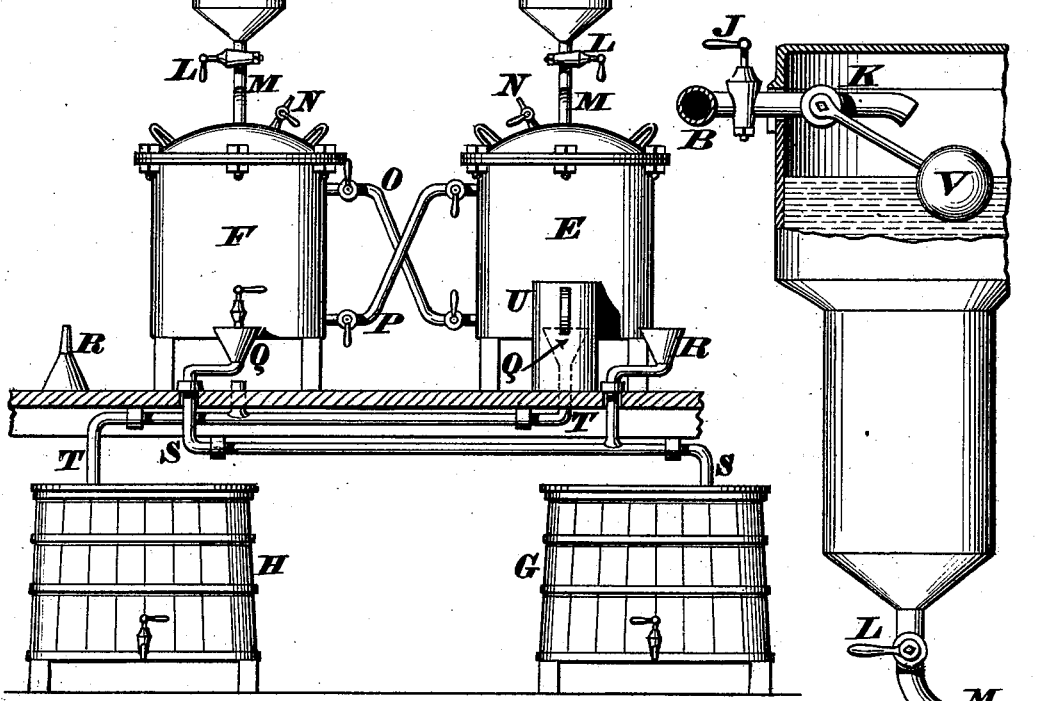
FIG. 3.
FIG. 2. FIG. 4.
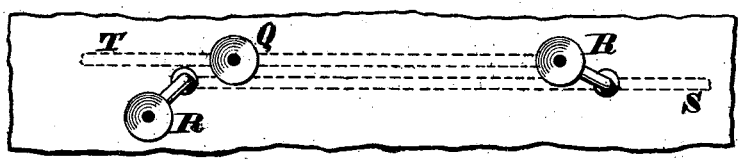
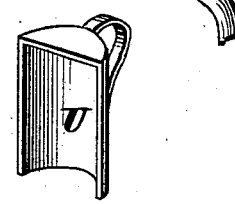
Attest. Inventor.
John H. Brockman

UNITED STATES PATENT OFFICE.

JOHN H. BROCKMAN, OF CINCINNATI, OHIO.

IMPROVEMENT IN RECTIFYING APPARATUS.

Specification forming part of Letters Patent No. 207,847, dated September 10, 1878; application filed February 8, 1878.

*To all whom it may concern:*

Be it known that I, JOHN H. BROCKMAN, of Cincinnati, Hamilton county, Ohio, have invented an Automatic Single, Double, and Reversible Rectifying-Machine, of which the following is a specification:

My invention relates to certain improvements in machinery for rectifying spirits.

Its principal features have for their object the provision of an automatic arrangement for checking the flow of the spirits when the filter becomes obstructed, the adaptation of the same machine to be used either as a double rectifier, or as several single and independent rectifiers, and of an arrangement by which the order of passing through the successive filters may be readily reversed, according to the relative condition of the filtering material.

For a full description of my improvements, reference is made to the accompanying drawings.

Figure 1 shows the machine in elevation. Fig. 2 shows the arrangement of the discharge-pipes and funnels beneath the filters E F of Fig. 1. Fig. 3 is a cross-section of the column C, taken through the line $x\,x$, Fig. 1, showing the internal arrangement of said column with the faucet J, a section of the main pipe B, and the ball-cock K, having the ball or float U; it also shows the curve of pipe M. Fig. 4 shows the shield U, also seen in Fig. 1.

A is a primary receptacle or reservoir for the spirits. The high-wines, after being sufficiently reduced, pass from the receiver A through the pipe B to the column C, which is provided with a faucet, J, and also with a ball-cock, K, which is self-acting, and serves to check the flow whenever there is any occasion to do so. From this column they pass through pipes M into the filter E or F, one or both. These filters are provided with the ordinary filtering material. The faucet L may be used to close these pipes. Where there is but a single rectification, the faucets in both of the pipes connecting the two filters are turned off, and, after passing through the first filter, the spirits pass through pipes provided for that purpose into other receptacles below.

O P are pipes connecting the two filters, so as to provide for double rectification. If the rectification is to be first through the right-hand filter the faucets of the pipe passing from the top of that filter to the bottom of the left-hand filter are closed, and the faucets in the pipe passing from the bottom of the right-hand filter to the top of the left filter are open. The spirits, after passing through the filtering material of the first filter, are forced, by the hydraulic pressure, up through the pipe that is left open into the second filter, where they pass through the filtering material provided in that, and out through the faucet at the bottom. When the spirits are passed first through the left-hand filter the faucets of the pipe passing from the bottom of that filter to the top of the right-hand filter are open, and the faucets to the other pipe closed. The hydraulic pressure received in the column forces the spirits up through this pipe, and so through the second filter. This arrangement enables the reversal of the order in which the spirits are passed through the several filters, and thus enables me to avail myself of the difference in the condition of the filtering material in each.

It is desirable to have the filtering material of the last filter through which the spirits are passed the more perfect in condition.

With this reversible filter I am able to pass the spirits through the filter in which the material is more nearly exhausted, in the first place, and thence through the one which has been more recently replenished until the material in the first is so far exhausted that it will no longer answer even as a first filter. I then can replenish the first filter with new material, and use the material in the second filter, which has become partly exhausted meanwhile for the first filtration, while the new material in the first filter answers the purpose of the second and last filtration. By arranging a number of these filters and columns in succession I may still further add to the advantage obtained by this reversible operation.

In the ordinary operation it is necessary to have the filter closely watched, so that when there is any clogging the supply of spirits may be arrested. With my improvement this necessity is obviated, the operation being automatic—that is to say, such that when there is any occasion for arresting the flow of spirits the rise of the spirits in the column occasioned by the clogging serves of itself to arrest that flow. This is done by means of the ball-cock connecting with the valve at the entrance of the column. The ball remains down and the valve open so long as the flow of the spirits through the filter is uninterrupted. If there is any clogging the rise of the spirits in the column floats the ball and closes the valve. There is also provided a faucet behind the valve of the ball-cock, by which the flow may be permanently arrested or regulated in quantity. A considerable pressure is required to force the spirits with sufficient rapidity from the bottom of the first filter to the top of the second. This pressure is secured in the columns C D, which are made of such size as may be necessary for that purpose. It is desirable to give them the conical shape near the bottom, and also to enlarge the cylinder near the top, as shown in the drawing. Upon the top of each filter is arranged an air-cock, N, which may also be used for washing the filter by attaching the hose to it. If preferred, the water for washing the filter may be applied through the columns. Near the discharge-cocks are arranged removable funnels Q R, connected with the different pipes S T leading to the several receptacles, so arranged that either may be turned under the faucet at pleasure. By turning either one of these funnels under the faucet I am enabled, without further labor, to bring the spirits into the particular receptacle with which the pipe to which this funnel is attached leads, and may thus turn the spirits into the different receptacles according to their quality.

U is a shield, which may be placed over the discharge-cocks, to prevent dust from reaching the spirit, also to prevent the evaporation of the spirits. This shield may be provided with a lock, so as to be closed and fastened by the Government inspectors, to secure continuous and uninterrupted distillation. Several primary receptacles may be constructed like that shown, with a pipe communicating with the main supply-pipe B, having a faucet so arranged as to open or close the connection with the main supply-pipe at will. One of these may be turned on when brought to any proof desired while the spirits in the other are being reduced. When the first is exhausted, or substantially so, the second may be turned on, and thus secure continuous operation. If made of such size that one of them will last twelve hours, one may be turned on in the morning, the other at night, and thus the distillation proceed without interruption.

The primary receptacle, as I have constructed the machine, is twelve feet in diameter and six feet high. The main pipe is one and a half inch in diameter, the main faucet being the same. The supply-faucet communicating with the columns is three-fourths of an inch in diameter. The ball on the ball-cock is six inches in diameter, and may be made of tin or copper, or any other suitable material. The top cylinder of the column is thirty inches in diameter and forty inches in height. The lower cylinder of the column is fifty-six inches in height and eight inch in diameter. The faucet leading out of the bottom of the column is one and a fourth inch in diameter. The pipe leading from this faucet is one inch. The pipe leading out of the bottom of the column tapers slightly, being one and a fourth inch in diameter at the faucet at the top, and one inch where it enters the filter. The air-cock at the top of the filter is three-fourths of an inch in diameter. The filter is forty-four inches in diameter and fifty-two inches in height, forty-eight inches of the height being in the cylinder and eight inches from the base to the apex of the cover. The pipes communicating between the several filters are one and a fourth inch in diameter. The exact proportions described are not essential. The filters are provided with the ordinary false bottom. The final receptacles can be made of any desired size, and arranged in such positions as may be convenient.

In a machine constructed in this way I am enabled to obtain and support all the pressure that is required, using filters made of ordinary copper or three-sixteenths-inch iron.

The two connections in the pipes extending from the columns to the filter, and also the pipes connecting the two filters, are made by union-joints. This enables the pipes to be removed readily whenever there is occasion for it.

I use a gasket for the packing of the lids of the filter, and for this purpose I find a three-ply rubber hose the most convenient material.

At the entrance of the main pipe in the primary receptacle I place a copper screen, which serves to prevent settlements or other obstructions from passing into the pipe.

I claim as my invention—

1. In combination with the pipe B and filter E of a rectifying-machine, the expanded column C, for the purpose of accumulating pressure in the filter, substantially as described.

2. The combination, in a rectifying apparatus, of two or more filters and connecting-pipes, arranged substantially as shown and described, so that either filter may be used alone or the spirits passed from the base of either one to the top of the next.

3. The combination, in a rectifying-machine, of the filters E F, two or more, with the pipes O P, in such a manner as to enable the order in which the spirits pass through the same to be reversed as the conditions of the filter may require, substantially as described.

4. In a rectifying apparatus, the combination of one or more filters, two or more pipes leading from each filter to different receptacles, and a movable funnel or funnels, for the purpose of directing the fluid into one or another of the pipes, as required, substantially as described and shown.

5. In combination with the faucet and discharge-pipes of a rectifying-machine, the shield U, substantially as and for the purposes described.

6. The combination, in a rectifying apparatus, of the means, substantially as shown, for automatically checking the flow of the spirits, and for rendering the filtration single, double, or reversible, at will.

JOHN H. BROCKMAN.

Witnesses:
ROBT. H. PARKINSON,
JEREMIAH F. TWOHIG.